March 10, 1970  R. F. ABERLE  3,499,249
KNIFE SHARPENING APPARATUS
Filed Jan. 23, 1968  3 Sheets-Sheet 1

INVENTOR.
ROY F. ABERLE
BY
Bernard Marlowe
ATTORNEY

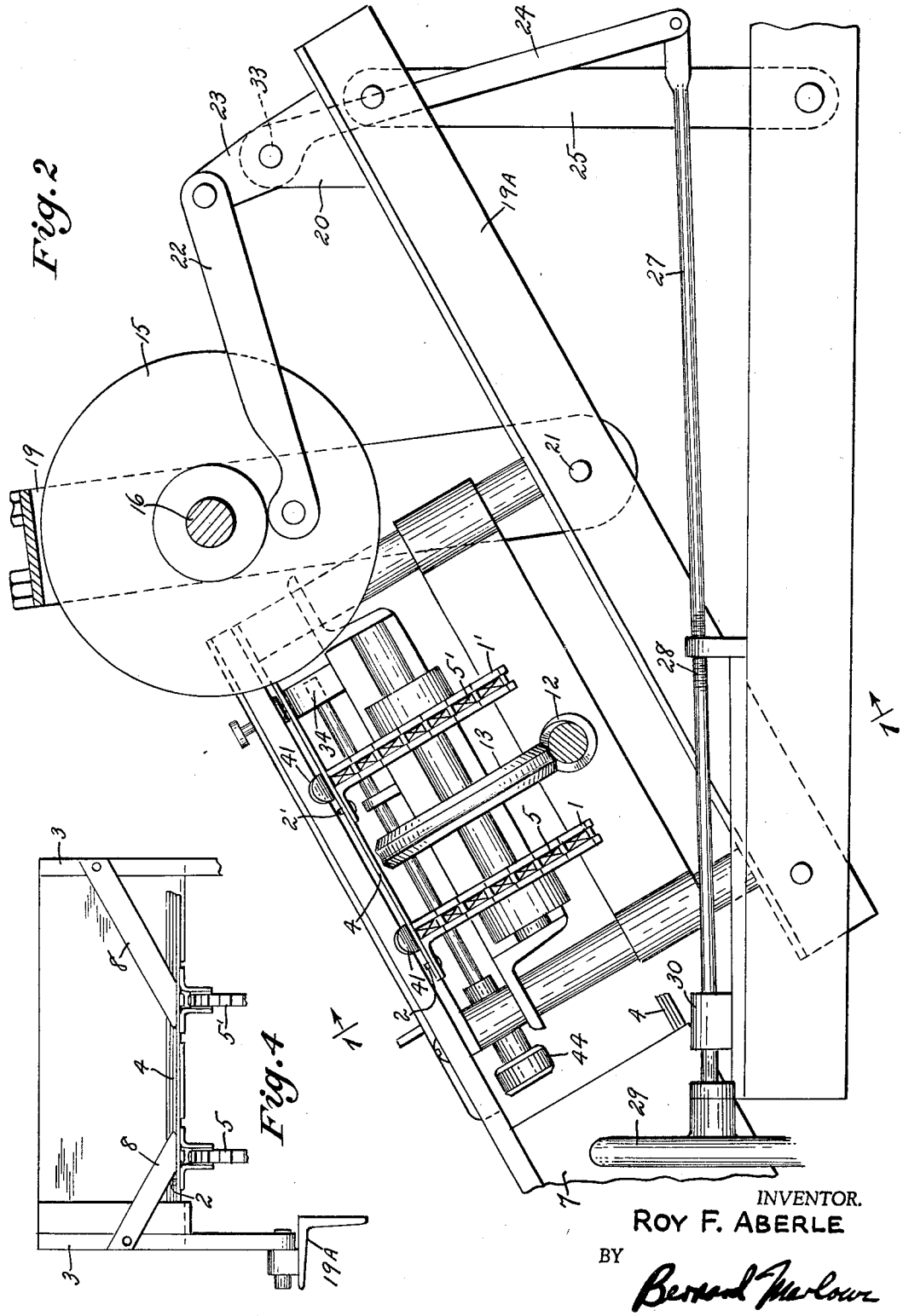

March 10, 1970 R. F. ABERLE 3,499,249
KNIFE SHARPENING APPARATUS
Filed Jan. 23, 1968 3 Sheets-Sheet 3
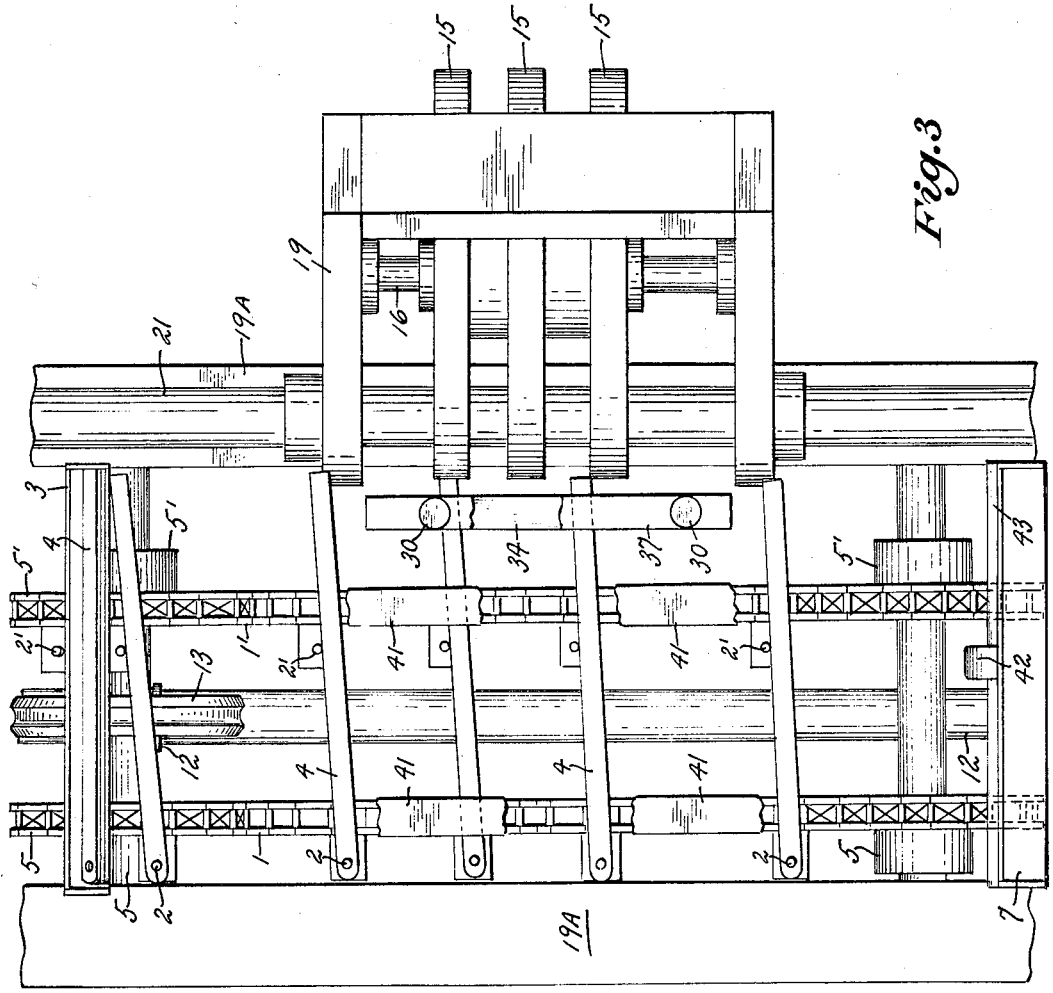
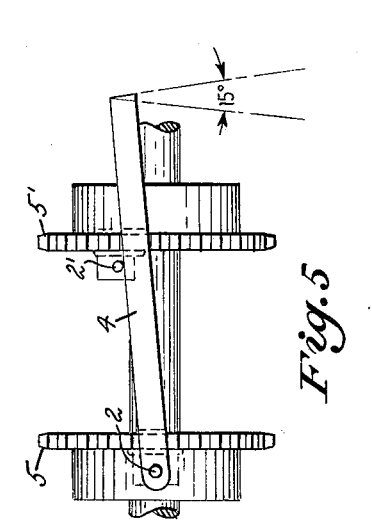
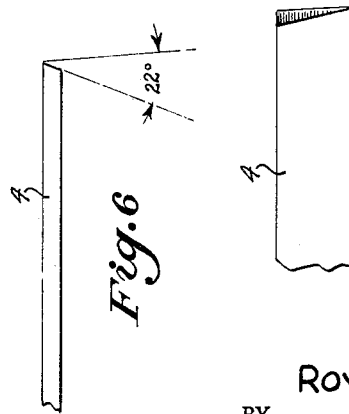
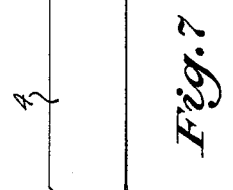
INVENTOR.
ROY F. ABERLE
BY
ATTORNEY United States Patent Office 3,499,249
Patented Mar. 10, 1970

3,499,249
KNIFE SHARPENING APPARATUS
Roy F. Aberle, Aberdeen, N.C., assignor to J. P. Stevens & Co., Inc., New York, N.Y., a corporation of Delaware
Filed Jan. 23, 1968, Ser. No. 699,856
Int. Cl. B24b 7/00, 9/00, 21/00
U.S. Cl. 51—76                                    4 Claims

ABSTRACT OF THE DISCLOSURE

A gravity assisted whetting device used to impart a variable bevel to the cutting edges of knives used in tufting machines. The device utilizes two separate studded endless conveyor chains to remove the unsharpened knives from a feed hopper to carry knives through the whetting cycle and to deposit the sharpened knives in a storage receptacle. The relative alignment of the two can be varied to change the bevel or angle imparted to the knives.

---

The invention relates to a novel apparatus for whetting the cutting edges of blades, knives and other cutting instruments utilized in commerce.

More particularly this invention concerns an apparatus for sharpening knives used in tufting machines during the course of manufacturing cut pile carpets.

Tufting processes are those which involve the insertion of a face yarn into a ready made backing fabric to produce the tufted fabric. The insertion of yarn is done by a needling technique and the inserted tufts are held in place by the blooming or untwisting action of the yarn plus the shrinkage of the backing fabric. In the manufacture of cut pile carpets (as opposed to loop pile carpets), the tufting steps are followed by at least one shearing or cutting step, both to remove the loops for aesthetic considerations and to minimize any tendency of the carpet to fuzz and pill during use.

While the maintenance of sharp cutting edges is a sine qua non to the success of any cutting process, for a number of reasons the problem is especially critical to cut-pile carpet manufacture. These include the number of knives used, the type of fibers cut, problems of distorted cuttings and shutdowns in production. For example, the number of cutting blades employed in a typical fifteen foot tufting machine approximates one thousand. Due to the high frequency of cutting there is a tendency for the blades to dull rapidly. This rapid dulling is particularly pronounced when synthetics such as nylon or polypropylene are used in the pile. These fibers act as abrasives to the edge of the cutting blades. Further, the use of less than sharp blades produces distortions in the cutting such as J cutting or irregular cuts causing a ragged appearance. Finally, as the cutting step is in an integral part of the cut-pile manufacturing operation, replacing the cutting blades causes a shut down of the whole process disrupting and delaying production schedules.

Currently, the sharpening of tufting machine knives is carried out manually. The knives are ground by hand on a conventional grinding wheel until the desired edge is obtained. Not only is the process slow and expensive, but it produces non-uniform sharpening. This can cause overheating of the knife which can damage or distort the temper of the steel. If this occurs the operational life of the blade is substantially shortened. Further, double beveled edges are difficult to obtain. In view of these problems peculiar to sharpening in the cut-pile industry and the inadequacy of manual grinding procedures there exists a need for an improved automatic sharpening procedure. Ideally, the desired apparatus would sharpen a plurality of blades quickly and uniformly without causing overheating and consequent damage to the temper and operational life of the blades. An apparatus of this type would minimize production shut-downs and would represent and advance in the sharpening art.

It is a broad object of this invention, among others, to provide an apparatus for whetting the cutting edges of cutting instruments automatically, quickly and uniformly.

It is a more specific object of this invention to provide an apparatus for whetting the cutting edges of blades employed in tufting machines during the manufacture of cut-pile fabrics.

Another object of this invention is to provide a mode of imparting a variable angle or bevel to the cutting edge of a knife by the employment of two separate studded conveyor chains whereby each chain is variably and laterally displaceable.

Yet a further object of this invention is the employment of a whetting machine angular tilted in operation so as to gravitationally aid in the release of the knives in the beginning and end of the whetting cycle.

Shill another object of this invention is the development of a whetting device affording continuous visual monitoring of the entire whetting process.

A further object is to provide a mechanically actuated whetting device superior to manually operated grinding procedures presently utilized in the cut-pile industry.

Additional objects will become apparent to those skilled in the art after a perusal of this invention and the accompanying drawings.

FIGURE 2 is an end elevation of the device in tilted operating position;

FIGURE 3 is a plan view of the device;

FIGURE 4 is a front view of the hopper;

FIGURE 5 is a plan view of a knife positioned for angular whetting;

FIGURE 6 is an edge view of the whet knife slightly exaggerated to show cutting angle at end of the knife; and FIGURE 7 is a plan view slightly exaggerated showing bevel of cutting edge.

Figure 1:
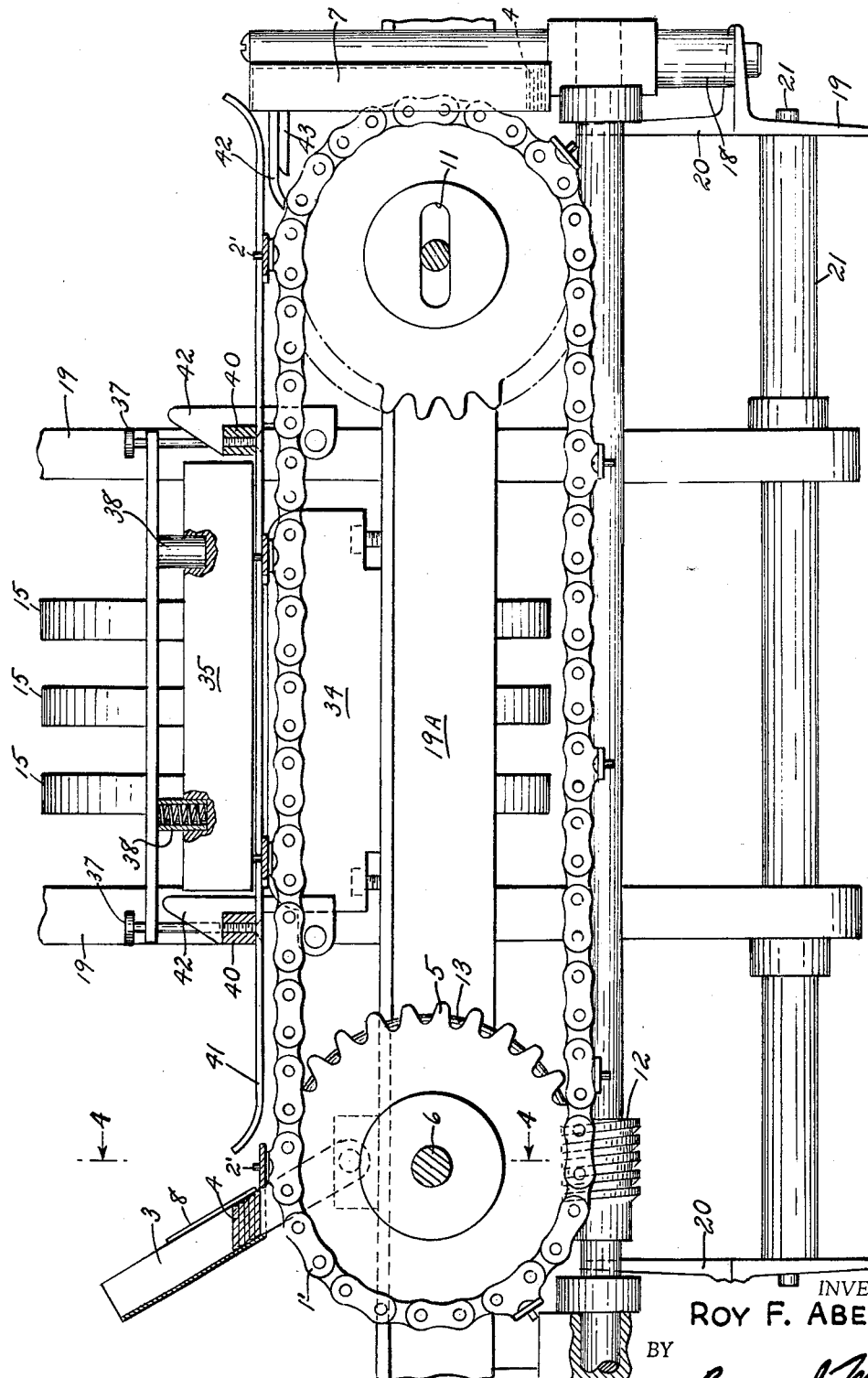
FIGURE 1 is a side elevation of the inventive whetting device.

FIGURE 1 is a side elevation of a knife sharpening apparatus comprising a frame 19 and supporting elevated frame structure 19A. The frame structure 19A accommodates a first hopper 3 for horizontally stacking unsharpened tufting knives 4 perforated at the non-cutting end, a pair of laterally adjustable, movable, parallel, endless conveyor chains 1 and $1^1$ which are preferably fabricated of steel but which can be made of other suitable materials including fiber glass. The chains are provided with a series of projecting pins 2 and $2^1$ at spaced intervals along the length of said chains, the former pins 2 are engaging pins for engaging the perforation provided in the non-cutting end of the knives, the latter pins $2^1$ are support or guide type pins which guide the cutting end of the tufting knives. The projecting pins utilizing the drive provided by the chains, transport the knives to a whetting means 15 preferably grinding wheels positioned on wheel arbor 16 driven by suitable drive (not shown).

The endless chains 1 and $1^1$ are engaged by sprockets 5 and $5^1$ journaled in bushing 6. Worm wheel 13 and worm 12 are driven by a suitable reduction drive (not shown) to convey the chain carrying the whet knives 4 against and past the whetting device 15 to a second hopper 7, used as a receptacle for the whetted knives.

The sprockets 5 and $5^1$ and their shafts (not shown) are journaled in suitable bearing with a slotted end take-up 11 for individual lateral movement. Adjacent to the stacking hopper 3 are hold-down rails 41 positioned above and parallel to the endless chains leaving just enough clearance between the chains and the rails to accommodate the whet knives as they leave the stacking hopper toward the whetting device. The hold-down rails prevent the knives from disengaging from the projecting pins. The hold-down rails are latched to the frame structure 19A by hooks 42. Under vertically applied tension 38 the friction plate 35 contacts the knife holding it with minimal vibration to sub-base 34 as the knife proceeds past the whetting means. As a knife is withdrawn from the hopper for whetting, a first set of stripping fingers 8 keeps the remaining knives stacked in the hopper. Each of the whetted knives 4 is provided with a hole in its non-cutting end to facilitate withdrawal from the first (stacking) hopper and transport of the unground knives to whetting.

To proceed to a more detailed description of FIGURE 1, the tufting knives 4 which are basically halved hacksaw blade blanks (without the saw teeth cut into the sides), provided with a perforation in the non-cutting end and stacked in hopper 3 are engaged by the projecting pin 2 located on the moving chain 1 closest to the observer. The knife is withdrawn from the stacking hopper 3 and at the same time a second projecting support pin $2^1$ of a series located at spaced intervals along the chain $1^1$ (farthest from the observer and closest to the grinding means) and moving at the same rate of speed as the first chain guides the cutting end of the knife and in conjunction with the chain carries the knife towards the grinding means. The relative lateral alignment between the two pins (engaging pin 2 and the support pin $2^1$), that is, whether the two pins coincide, trail or lag each other, varies the angle defined by the two pins and the knife. This angle establishes the angle of the cutting edge of the knife blade. As indicated previously, since the two chains can be separately and laterally displaced it enables the selection of the desired angle to be imparted to the cutting edge. The engaged knife 4 coming out of the first (storage) hopper 3 advances along the chains 1 and $1^1$ toward the grinding means and comes under the hold-down rails 41 which prevent the knife from slipping off the pins 2 and $2^1$. The knife then progresses to the underneath support bar 34 which is kept under tension by the upper friction plate 35. The tension of the plate keeps the cutting end of the knife firmly anchored against the projecting pin $2^1$ and the tilt of the frame drops the ground knife into the second hopper 7.

FIGURE 2 shows the device in its normal tilted operating position. The angular tilt is necessary to gravitationally dispose of the knives after whetting. The particular angle of tilt employed is a function of the speed that the knife travels in the whetting cycle; the greater the speed, the greater the angle of tilt needed. At a rate of 2700 knives an angle of about 20°–30° suffices. Returning to FIGURE 2, the bar 25 supports the elevated end of the frame 19 pivotable on shaft 21 and horizontally adjustable by means of a linkage 22, lever 23, pivot 33, movable block 30 and hand wheel 29, equipped with ball bearings 32. The ganged grinding wheel arbor is equipped with ball bearings driven by a driving means not shown. The frame 19 is swingable to supply the desired grinding contact between wheels 15 and knives 4 so as to obtain the desired bevel. It should be noted that the center of arbor 16 is below the plane of knives 4 in all useful adjusted positions of frame 19. Frame 19 is adjustable about shaft 21 by link 22 connected to lever 24 and rod 27 secured to block 30 threaded on shaft 28 rotated by hand wheel 29.

A knurled knob 44 operates block 34 which supports the knife controlling the overhang of the knife end during grinding of the knives to the desired edge.

FIGURE 3 illustrates the apparatus in operation with some of the detail of FIGURES 1 and 2 omitted. One knife is shown just after leaving the first hopper and being engaged by pins 2 and $2^1$. A second and third knife is shown within the whetting cycle and a fourth fully whet knife has completed the whetting cycle on the way to delivery to the second hopper 7.

FIGURE 4 is a front view of the hopper.

FIGURE 5 shows the cutting angle created by laterally displacing chain 1 (not shown) in advance of chain $1^1$ so that pin $2^1$ lags pin 2 and with the knife 4 define an angle of 12°.

FIGURE 6 shows one side of the whet cutting edge of the sharpened knife.

FIGURE 7 shows the bevel of the fully whet knife.

Other modifications and variations can be made in the construction and arrangement of the salient parts of the sharpening apparatus without departing from the inventive device. The metes and bounds of this invention are best described by the claims which follow:

What is claimed is:

1. An apparatus for providing a selected compound bevel to the cutting end of tufting knives perforated at their non-cutting end comprising, a frame, a whetting device, a first hopper for storing the non-whetted knives, a second hopper for storing the whetted knives, said whetting device being attached to said frame and being located between the two hoppers, a first and second movable endless conveyor chain positioned side by side and parallel to each other, both chains containing projecting pins at spaced intervals along their surface, said chains extending from the first hopper, past the whetting device through to the second hopper, means for moving said chain at a selected speed, said first chain being situated parallel to the whetting surface of the whetting device, said projecting pins of said first chain being adapted to engage the perforation contained in the non-cutting end of said whetted tufting knife from the first hopper on its way to the whetting device, said second chain being situated between said first chain and the whetting device and being positioned proximate to said whetting means, said projecting pins of said second chain being adapted to firmly support said cutting end of said knife on its way to the whetting device, a first stripping means located proximate to the first hopper and adapted to retain all but the bottom blade to be withdrawn from said first hopper, a horizontal guide means vertically loaded to firmly maintain said knives aligned on said first and second chains through the whetting cycle, means for adjusting the rotational displacement of said first and second chains relative to each other so as to displace said projecting pins thereof to provide an adjustable angle for the knife, a second stripping means located at the end of said chain conveyor and adapted to remove said tufting knives from the engaging and supporting pins of said first and second chains after whetting, for depositing same into the second storage hopper.

2. The apparatus of claim 1 wherein the apparatus is tilted at an angle ranging from about 20° and over during operation.

3. The apparatus of claim 2 wherein the angular tilt of the apparatus ranges between about 20° and 75°.

4. The apparatus of claim 1 wherein the angular displacement of the first chain relative to the second chain defines an angle between about 20°–30°.

References Cited

UNITED STATES PATENTS

| | | | |
|---|---|---|---|
| 888,816 | 5/1908 | Kaeser | 51—61 X |
| 2,250,720 | 7/1941 | Morris | 51—74 |
| 2,732,590 | 1/1956 | Le Clercq | 51—110 X |

FOREIGN PATENTS 510,105   4/1952   Belgium.

OTHELL M. SIMPSON, Primary Examiner

U.S. Cl. X.R.

51—61, 138